Oct. 9, 1934.     F. A. YOUNG, JR     1,976,425
CORN POPPER
Filed Sept. 30, 1933     2 Sheets-Sheet 2
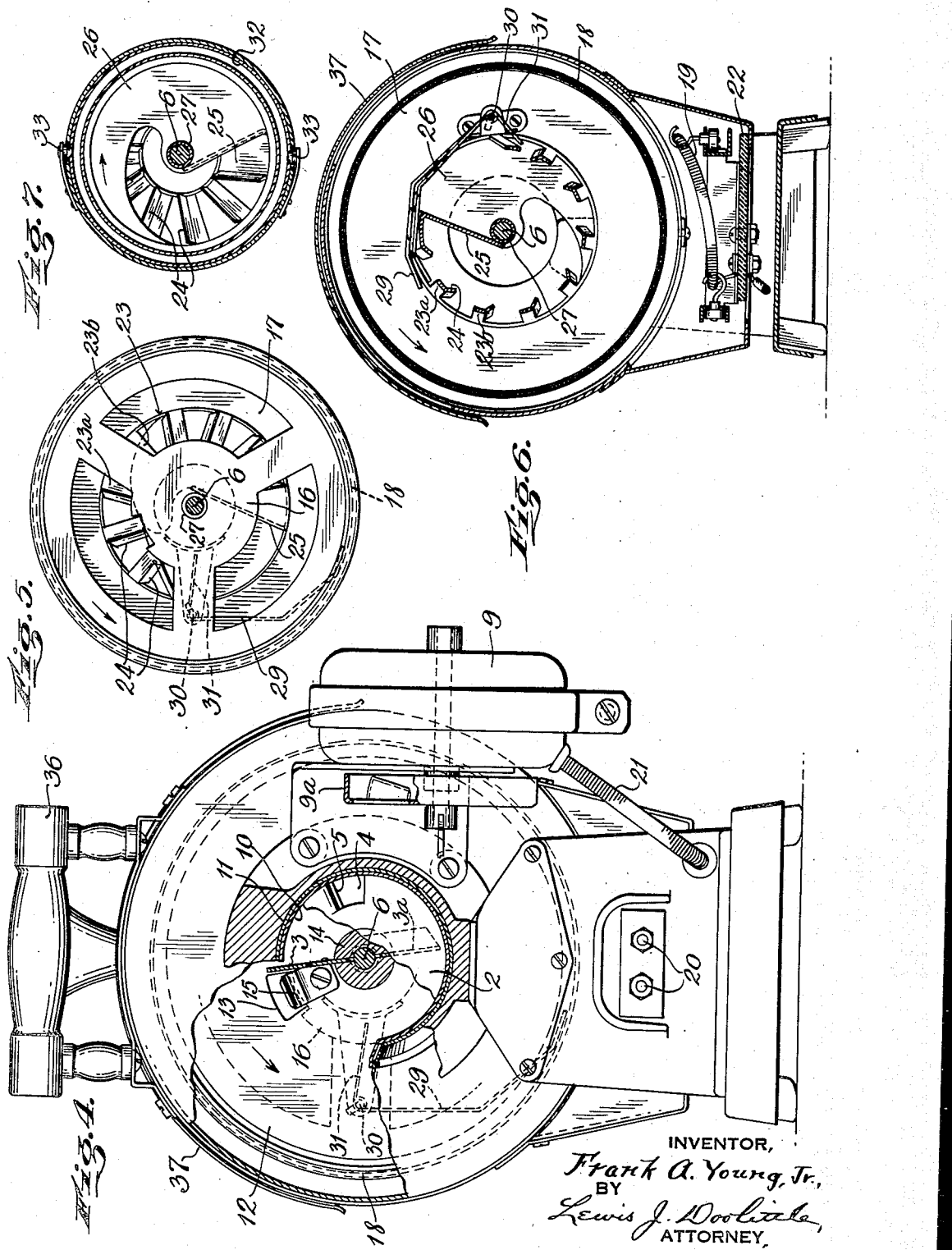
INVENTOR,
Frank A. Young, Jr.,
BY Lewis J. Doolittle,
ATTORNEY.

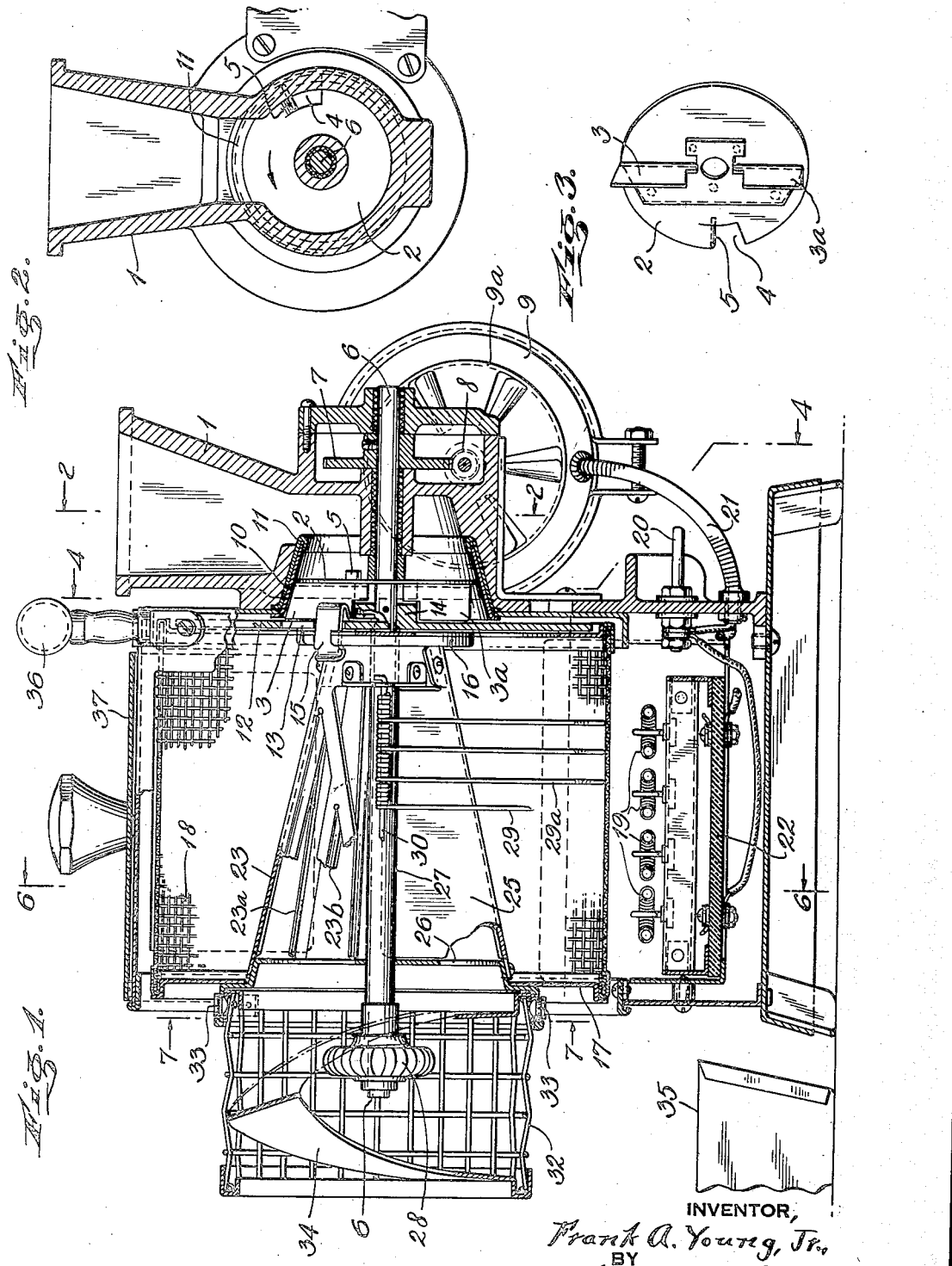

Patented Oct. 9, 1934

1,976,425

UNITED STATES PATENT OFFICE 1,976,425

CORN POPPER

Frank A. Young, Jr., Meriden, Conn., assignor to The E. C. Wilcox Corporation, Meriden, Conn., a corporation of Connecticut Application September 30, 1933, Serial No. 691,661

15 Claims. (Cl. 53—4)

This invention relates to a machine for popping corn and the object of the invention is to provide a device which shall be automatic in its operations to deliver only the perfectly popped kernels, separating out the unpopped or partially popped kernels and also removing all foreign particles, chaff, etc., which may be mixed with the corn as furnished commercially for popping.

The popping of the corn is accomplished by the application of sufficient heat to the kernels for a sufficient time to cause the bursting of the kernels by the expansion of the moisture contained therein. To accomplish this result is a simple matter, so far as the average kernels of corn are concerned, but the commercial corn available in the market contains imperfect kernels, chaff, foreign substances, etc., which is allowed to become mixed with the completely and perfectly popped kernels would render the same unpalatable and undesirable for eating purposes.

One of the important objects of this invention is to automatically remove all unpopped or partially popped kernels and also all such other undesirable particles during the operation of the machine and to deliver only perfectly and completely popped kernels.

The details of construction of the several parts of the device as shown in the accompanying drawings, illustrating one operative embodiment of my invention, will be described hereinafter.

In the drawings, like parts in the several views have been given the same reference numeral.

Fig. 1 is a sectional side elevation of a machine embodying my invention; Fig. 2 is a sectional end view taken on the line 2—2 of Fig. 1; Fig. 3 is a detail view in perspective of the metering disk; Fig. 4 is a sectional end view taken on the line 4—4 of Fig. 1; Fig. 5 is an end view, in reduced scale, of the popping drum, taken in the same direction as Fig. 4; Fig. 6 is a section, in reduced scale, taken on the line 6—6 of Fig. 1; Fig. 7 is a section, in reduced scale, taken on the line 7—7 of Fig. 1. The arrows in Fig. 1 indicate the direction in which the several sectional views are taken.

The device as shown comprises a hopper, 1, into which the corn to be popped is placed. At the lower end of the hopper 1 is a feeding mechanism and metering means, including a disk 2 (Figs. 1 and 2) mounted on an operating shaft, 6, driven through a worm and gear, 7—8, by a suitable motor 9. A rotatable popping cylinder, comprising a body portion 18, of foraminous material, such as wire mesh of predetermined size, carried by inner and outer end members, 16 and 17, which are carried upon the shaft 6. A driving head 12 is mounted upon and rotated with the shaft 6 and is provided with a spring latch 15 by means of which the inner end member 16 of the popping cylinder is engaged therewith (Fig. 1) and rotated. A conical shaped delivery funnel 23 is mounted in the interior of the popping cylinder 18, with its small end attached to the inner end member 16 and its large end attached to the outer end member 17 of the popping cylinder, as shown in Fig. 1.

A series of pick-up fingers, 29, 29a, etc., are pivotally mounted upon a support 30 (Figs. 1, 5 and 6) to swing between the inside face of the popping cylinder 18 and the outer face of the delivery funnel 23, as will be described hereinafter.

Heater coils 19 are positioned adjacent the lower side of the popping cylinder 18 (Figs. 1 and 6) and the entire mechanism is mounted in a suitable frame or casing, provided with a supporting base, as shown in Figs. 1 and 4.

A separating cylinder of wire mesh, 32, is detachably mounted upon the outer side of the outer end 26 of the delivery funnel 23 (Fig. 1) and is provided with a helical baffle 34 on the interior thereof. The wire mesh of this separating cylinder 32 is coarser than the mesh of the popping cylinder 18, the purpose being to effect a final separation and removal of unpopped kernels and other undesired material and deliver only the completely popped kernels from the outer end thereof, as will be explained hereinafter.

More specific details and features of construction of the several parts of the device will be more fully described in connection with the operation thereof.

The corn is fed into the hopper 1 and rests against the outer side of a metering disk 2 (Figs. 1 and 3). This metering disk is provided with a cross member or partition 3 extending from its inner side and having one end, 3a, shorter than the other. An inlet opening 4 is formed in the periphery of the disk 2 and a projecting portion, or agitator, 5 extends outwardly from the outer side of the disk 2 adjacent the opening 4. This provides a plurality of compartments through which the kernels of corn pass from the hopper 1 to the popping cylinder, as will be described hereinafter.

An operating shaft 6 (Fig. 1) is provided with a gear 7 driven by a worm 8 operatively connected by suitable connection to a motor 9 (Fig. 4). A fan 9a may be provided, if desired, for cooling the motor. The particular type of motive power utilized, however, is not a part of the present invention.

Mounted in the frame of the machine at the delivery end of the hopper 1 (Fig. 1) and surrounding the metering disk 2 is conical cup-shaped member 10, with its large end toward the inner portion of the machine. This cup-shaped member 10 is loosely carried and freely rotatable in the outer and similar shaped member 11, which is fixed in position in the frame of the machine. The outer end of this member 11 is bent inwardly over the end of the inner member 10 and prevents particles of the material from the hopper entering between the members 10 and 11. The member 10 being free to rotate, either in the outer member 11 or about the disk 2, prevents the mechanism from becoming jammed if particles of material become temporarily wedged or lodged between the disk 2 or partition 3 and this conical member 10.

The kernels falling from the hopper 1 against the outer side of the disk 2 fall to the lower side thereof and are prevented from becoming jammed or wedged by the projection 5 and as the opening 4 reaches the lower side the particles will pass therethrough to the first compartment on the opposite side of the disk 2 on one side of the partition 3 and upon further rotation of the disk 2 the short end of the partition 3 permits the kernels to pass between this end of the partition and the conical member 10 to the second compartment on the opposite side of the partition 3 and are then carried around by the opposite or long end of the partition 3 to a feed opening (13) to the driving head 12 adjacent the inner end 16 of the popping drum, hereinafter described.

The driving head 12 is provided with a feed opening 13 from the second compartment above described and is mounted upon and rotated by the shaft 6 (Fig. 1) by means of a hub or collar 14. This hub is slotted to receive the central portion of the partition member 3 on the disk 2 and causes the rotation of the same with the shaft and driving head 12, as will be understood by reference to the drawings.

A spring latch member 15 is mounted upon the driving head 12, passing through the feed opening 13 therein, and engages over the inner end portion 16 of the popping cylinder, which latter is formed with an outer end member 17 (Fig. 1) between which end members a cylindrical body portion 18, of wire mesh, is carried. The mesh is of a size to hold the unpopped kernels of corn, which are fed thereinto through the feed opening 13, heretofore described, and fall to the bottom portion thereof over heater coils 19, which latter are heated in the usual manner by current supplied from the terminals 20 from any suitable source of electric current. A cable 21 may also supply current for operation of the motor 9 from these same terminals 20, as will be understood. An asbestos base 22 may also be provided beneath the heating coils 19, as shown.

Mounted interiorly and co-axially of the popping cylinder 18 is a delivery funnel, conical in shape and formed of a number of spaced strips, shown at 23, 23a, 23b, etc., the spacing being such that unpopped kernels, partly popped kernels, etc., will fall therethrough while the popped kernels will be retained and passed to the large end thereof as the funnel is rotated. The strips, 23, are formed with a fin bent inwardly along one edge thereof (Fig. 6) to deflect the popped kernels falling into the delivery funnel and prevent any tendency to drop therethrough or become wedged in the slots between the strips 23 and also to direct unpopped kernels through the slots, causing the same to fall back into the popping cylinder.

A relatively wide opening is provided on one side of the delivery funnel 23 and a baffle wall 25 extends from one side of this opening inwardly to the central sleeve 27, upon which the outer end 26 of the delivery funnel and the outer end 17 of the popping cylinder attached thereto are mounted and at the opposite end of which the inner end of the popping cylinder and delivery funnel, 16, are mounted. This sleeve 27 is slidably mounted upon the shaft 6, as shown in Fig. 1. A knob 28 at the outer end of the cylinder is attached to this sleeve 27 and provides a convenient means for sliding the cylinder out of the casing from the shaft 6.

As the popping cylinder 18 is rotated, the kernels heated by the heating coils 19 explode or "pop" and become enlarged to several times their former size, as is well understood. These popped kernels become mixed with the unpopped kernels in the cylinder 18 and as the same is rotated the popped kernels are picked up by the series of wire fingers 29, 29a, 29b, etc. (Figs. 1, 4, and 5), which are independently hinged upon a rod 30 and are formed with inwardly extending ends 31, extending inwardly toward the opening in the delivery funnel 23 on the side opposite the baffle wall 25. As the popping cylinder 18 is further rotated from the position shown in Figs. 1, 4 and 5 to that shown in Fig. 6 (approximately 180 deg.), the outer ends of the fingers 29, which have picked up the popped kernels, fall inwardly against the delivery funnel 23 and the popped kernels fall through the opening therein adjacent the baffle wall 25 in the delivery funnel 23 (Fig. 6) into the interior thereof, the inner inwardly extending ends 31 of the fingers preventing the popped kernels from falling back into the cylinder 18, as will be seen by reference to Figs. 5 and 6, showing the successive positions of these fingers. The baffle wall 25 in the delivery funnel 23 prevents the popped kernels thus delivered thereinto from falling back through the opening between the strips through which the same were admitted, upon further rotation of the funnel. The tapered form of the delivery funnel 23 causes the kernels to pass to the outer end thereof and into a separating cylinder 32 mounted on the outer end thereof (Fig. 1) by means of spring latches 33 for ready removal thereof. The separating cylinder 32 is of somewhat coarser mesh than that of the popping cylinder 18 and permits any partly popped kernels which have passed the delivery funnel to fall therethrough into a tray 35 placed beneath, as shown in Fig. 1.

An interior helical baffle 34 in the separating cylinder 32 carries the popped kernels through the separating cylinder 32 and delivers the same to a suitable receptacle, not shown, free from all unpopped or partly popped kernels, chaff or other undesired particles.

It will be noted that the feeding means provided for delivering the kernels from the hopper to the popping drum does not involve any slides or valve mechanism and thus avoids any tendency for the device to become inoperative or kernels becoming wedged and stopping the feeding of the same. The independent action of the pick-up fingers in the popping drum prevents any wedging of the kernels between the same.

The heating coils are preferably placed to one side of the lowest point, as shown in Fig. 6, in order to obtain a more efficient application of the heat to the kernels being carried around by the popping drum.

The popping cylinder or drum and the separating cylinder may be removed readily, as described, in order to empty out the accumulated unpopped and partly popped kernels, chaff, etc., therefrom.

It will be noted that the entire construction is so designed as to avoid any complicated mechanism or parts and the same may, consequently, be manufactured very cheaply and will be very efficient and useful for use on a table, etc., in the same manner as the electric toasting devices in common use.

A handle 36 may be provided for carrying the device from place to place and also a cover 37, semi-circular in form, removably placed about the upper part of the frame over the popping drum 18 to retain the heat therein.

What I claim as new and desire to secure by Letters Patent is:—

1. A corn popping device comprising a hopper, metering means associated therewith consisting of feeding mechanism and a plurality of compartments through which a limited amount of the kernels are passed at a predetermined rate, a rotatable popping cylinder, a driving head provided with means for rotating said popping cylinder and means for admitting the kernels thereto, heating means positioned adjacent said popping cylinder, a delivery funnel mounted interiorly of said popping cylinder, a series of pick-up fingers mounted between said delivery funnel and popping cylinder adapted to transfer the popped kernels from said cylinder to said funnel, a separating cylinder mounted adjacent the outer end of said delivery funnel adapted to deliver only the popped kernels after separating any remaining unpopped kernels therefrom, and means for rotating the aforesaid parts of the device.

2. A corn popping device comprising a hopper, metering means associated therewith consisting of a rotatable metering disk having a partition mounted on the inner side thereof forming two compartments with a communicating passage at one end of said partition and an inlet opening in said disk from said hopper to one of said compartments, a rotatable popping cylinder, a driving head provided with means for rotating said metering disk and said popping cylinder together with means for admitting the kernels from the other of said compartments to said popping cylinder, heating means positioned adjacent said popping cylinder, a delivery funnel mounted interiorly of said popping cylinder, a series of pick-up fingers mounted between said delivery funnel and popping cylinder adapted to transfer the popped kernels from said cylinder to said funnel, a separating cylinder mounted adjacent the outer end of said delivery funnel adapted to deliver only the popped kernels after separating any remaining unpopped kernels therefrom, and means for rotating the aforesaid parts of the device.

3. A corn popping device comprising a hopper, metering means associated therewith consisting of a rotatable metering disk having a partition mounted on the inner side thereof forming two compartments with a communicating passage at one end of said partition and an inlet opening from said hopper to one of said compartments, an agitator comprising a projecting member extending from the outer side of said disk adjacent one side of said inlet opening, a rotatable popping cylinder, a driving head provided with means for rotating said metering disk and said popping cylinder positioned on the opposite side thereof from said metering disk and compartments together with means for admitting the kernels from the other of said compartments to said popping cylinder, heating means positioned adjacent said popping cylinder, a delivery funnel mounted interiorly of said popping cylinder, a series of pick-up fingers mounted between said delivery funnel and popping cylinder adapted to transfer the popped kernels from said cylinder to said funnel, a separating cylinder mounted adjacent the outer end of said delivery funnel adapted to deliver only the popped kernels after separating any remaining unpopped kernels therefrom, and means for rotating the aforesaid parts of the device.

4. A corn popping device comprising a hopper, metering means associated therewith consisting of a rotatable metering disk having a partition mounted on the inner side thereof forming two compartments with a communicating passage at one end of said partition and an inlet opening in said disk from the hopper to one of said compartments, an inner conical cup-shaped member carried by and freely rotatable in an outer similar shaped member fixed in position in the frame, said inner member enclosing the periphery of said disk, a rotatable popping cylinder, a driving head provided with means for rotating said metering disk and said popping cylinder positioned on the opposite side thereof, together with means for admitting kernels from the other of said compartments to said popping cylinder, heating means positioned adjacent the lower side of said popping cylinder, a delivery funnel mounted interiorly of said popping cylinder, a series of pick-up fingers mounted between said delivery funnel and popping cylinder adapted to transfer the popped kernels from said cylinder to said funnel, a separating cylinder mounted adjacent the outer end of said delivery funnel adapted to deliver only the popped kernels after separating any remaining unpopped kernels therefrom, and means for rotating the aforesaid parts of the device.

5. A corn popping device comprising a hopper, metering means associated therewith consisting of feeding mechanism and a plurality of compartments through which a limited amount of the kernels are passed at a predetermined rate, a rotatable popping cylinder, a driving head positioned adjacent said metering means and forming one side of said compartments and provided with a feed opening communicating between one of said compartments and said popping cylinder positioned on the opposite side thereof and rotated therewith, heating means positioned adjacent the lower side of said popping cylinder, a delivery funnel mounted interiorly of said popping cylinder, a series of pick-up fingers mounted between said delivery funnel and popping cylinder adapted to transfer the popped kernels from said cylinder to said funnel, a separating cylinder mounted adjacent the outer end of said delivery funnel adapted to deliver only the popped kernels after separating any remaining unpopped kernels therefrom, and means for rotating the aforesaid parts of the device.

6. A corn popping device comprising a hopper, metering means associated therewith consisting of a rotatable metering disk having a partition mounted on the inner side thereof forming two compartments with a communicating passage at one end of said partition and an inlet opening in said disk from said hopper to the first of said compartments, a rotatable popping cylinder, a driving head positioned adjacent said metering means and forming one side of said compartments and provided with a feed opening communicating between the second of said compartments and said popping cylinder positioned on the opposite side thereof and rotated therewith, heating means positioned adjacent the lower side of said popping cylinder, a delivery funnel mounted interiorly of said popping cylinder, a series of pick-up fingers mounted and adapted to swing between said popping cylinder wall and delivery funnel and to transfer the popped kernels from said cylinder to said funnel, a separating cylinder mounted adjacent the outer end of said delivery funnel adapted to deliver only the popped kernels after separating any remaining unpopped kernels therefrom, and means for rotating the aforesaid parts of the device.

7. A corn popping device comprising a hopper, metering means associated therewith consisting of feeding mechanism and a plurality of compartments through which a limited amount of kernels are successively passed, a popping cylinder, a driving head provided with means for rotating said popping cylinder and with means for admitting the kernels passed through said compartments to said cylinder, said rotatable popping cylinder being removably connected with said driving head and comprising a wire mesh of a size to hold unpopped kernels, said wire mesh being held between inner and outer end members mounted on a central sleeve slidably carried upon an operating shaft, an operating shaft to which said driving head is attached and upon which said popping cylinder is mounted, a motor for operating said shaft, heating means positioned adjacent said cylinder, a delivery funnel mounted interiorly of said cylinder, a series of pick-up fingers pivotally mounted between said cylinder and delivery funnel adapted to transfer the popped kernels from said cylinder to said funnel, and a separating cylinder mounted adjacent the outer end of said delivery funnel adapted to deliver only the popped kernels after separating any unpopped kernels therefrom.

8. A corn popping device comprising a hopper, a popping cylinder, metering means associated therewith for passing a limited amount of kernels from the hopper to said popping cylinder, a driving head provided with a feed opening through which the kernels are admitted to the popping cylinder from said metering means and also provided with means for driving said cylinder, heating means positioned adjacent said cylinder, a delivery funnel mounted interiorly of said popping cylinder and formed with a number of spaced strips with a spacing permitting unpopped kernels to fall therebetween while retaining the popped kernels therein and passed to the large end thereof as the same is rotated, a series of pick-up fingers mounted between said funnel and cylinder and adapted to transfer the popped kernels from said cylinder to said funnel, a separating cylinder mounted adjacent the large end of said funnel and adapted to deliver only the popped kernels after separating any remaining unpopped kernels therefrom, and means for rotating said parts.

9. A corn popping device comprising a hopper, a popping cylinder, metering means associated therewith for passing a limited amount of kernels from the hopper to said popping cylinder, a driving head provided with a feed opening through which the kernels are admitted to the popping cylinder from said metering means and also provided with means for driving said cylinder, said popping cylinder being removably mounted on one side of said driving head, heating means positioned adjacent said cylinder, a delivery funnel formed of a number of spaced strips with a spacing permitting unpopped kernels to drop therebetween while retaining the popped kernels therein and caused to pass to the large end of the funnel as the same is rotated, one side of said funnel being provided with a relatively wide spacing of the strips to permit the popped kernels from the popping cylinder to pass therethrough to the interior thereof, a series of pick-up fingers hinged between said funnel and cylinder and adapted to transfer the popped kernels from the cylinder to the funnel through said opening provided on one side of the funnel, a separating cylinder mounted adjacent the large end of said funnel and adapted to deliver only the popped kernels after separating the unpopped kernels therefrom, and means for rotating said parts.

10. A corn popping device comprising a hopper, a popping cylinder, metering means associated therewith for passing a limited amount of kernels from the hopper to said popping cylinder, a driving head provided with a feed opening through which the kernels are admitted to the popping cylinder from said metering means and also provided with means for rotating said cylinder, said popping cylinder being removably mounted on one side of said driving head, heating means positioned adjacent said cylinder, a delivery funnel formed of a number of spaced strips each of which is formed with a fin bent inwardly along one edge thereof to deflect the popped kernels falling into said funnel, a series of pick-up fingers mounted between said cylinder and funnel and adapted to transfer the popped kernels from said cylinder to said funnel, a separating cylinder mounted adjacent the outer end of said funnel and adapted to deliver only the popped kernels after separating the unpopped kernels therefrom, and means for rotating said parts.

11. A corn popping device comprising a hopper, a popping cylinder, metering means associated therewith for passing a limited amount of kernels from the hopper to a popping cylinder, a driving head provided with a feed opening through which the kernels are admitted to the popping cylinder from said metering means and also provided with means for rotating said metering mechanism and said popping cylinder, said popping cylinder being removably mounted on one side of said driving head, heating means positioned adjacent the lower side of said popping cylinder, a delivery funnel formed of a number of strips spaced to hold the popped kernels against passing therebetween while permitting unpopped kernels to fall out therethrough and also provided with a relatively large opening on one side of the wall with a baffle wall extending from one side of this opening inwardly to a central sleeve upon which the outer and inner supporting ends of the funnel and cylinder are carried and said sleeve being slidably mounted upon a driving shaft which rotates said driving head, means for driving said shaft, and a series of pick-up fingers pivotally mounted between said cylinder and funnel and adapted as the same are rotated to transfer the popped kernels from said cylinder to said funnel through said opening in the side wall thereof.

12. A corn popping device of the class described, comprising a hopper, a popping cylinder, metering means for passing a limited amount of kernels to said popping cylinder, a driving head to which said popping cylinder is removably connected, a delivery funnel mounted interiorly of said popping cylinder, a series of pick-up fingers mounted between said funnel and cylinder adapted to deliver the popped kernels to said funnel from said cylinder, said fingers being formed with outer ends adapted to rest against the inner surface of said cylinder and inwardly extending ends extending toward the funnel, and means for rotating said parts.

13. In a corn popping device of the class described, the combination with a hopper, a popping cylinder, metering means for passing a limited amount of kernels to said popping cylinder, a driving head to which said cylinder is removably connected, a delivery funnel mounted interiorly of said cylinder, a series of pick-up fingers independently hinged upon a mounting between said cylinder and funnel and adapted to transfer the popped kernels from the cylinder to the funnel, means for separating the unpopped from the popped kernels, and means for rotating the said parts of the device.

14. In a corn popping device of the class described, the combination of a hopper, a popping cylinder, metering means for passing a limited amount of kernels to said popping cylinder, a driving head to which said cylinder is removably attached, a delivery funnel mounted interiorly of said cylinder, a series of pick-up fingers adapted to transfer the popped kernels from said cylinder to said funnel, a separating cylinder removably mounted at the outer large end of said funnel, said separating cylinder being of a relatively coarse mesh and provided with an interior helical baffle member which carries the popped kernels through the separating cylinder while separating any unpopped kernels therefrom, and means for rotating said parts.

15. A corn popping device comprising a hopper, metering means associated therewith consisting of feeding mechanism and a plurality of compartments through which a limited amount of the kernels are passed at a predetermined rate, a rotatable popping cylinder, a driving means for rotating said popping cylinder and means for admitting kernels thereto, heating means positioned adjacent said popping cylinder, delivery means mounted interiorly of said popping cylinder, a series of pick-up fingers mounted between said delivery means and popping cylinder, adapted to transfer the popped kernels from said cylinder to said delivery means, and means for rotating the aforesaid parts of the device.

FRANK A. YOUNG, Jr.